B. F. FIELD.
Steam-Plow.
No. 24,799. Patented July 19 1859.
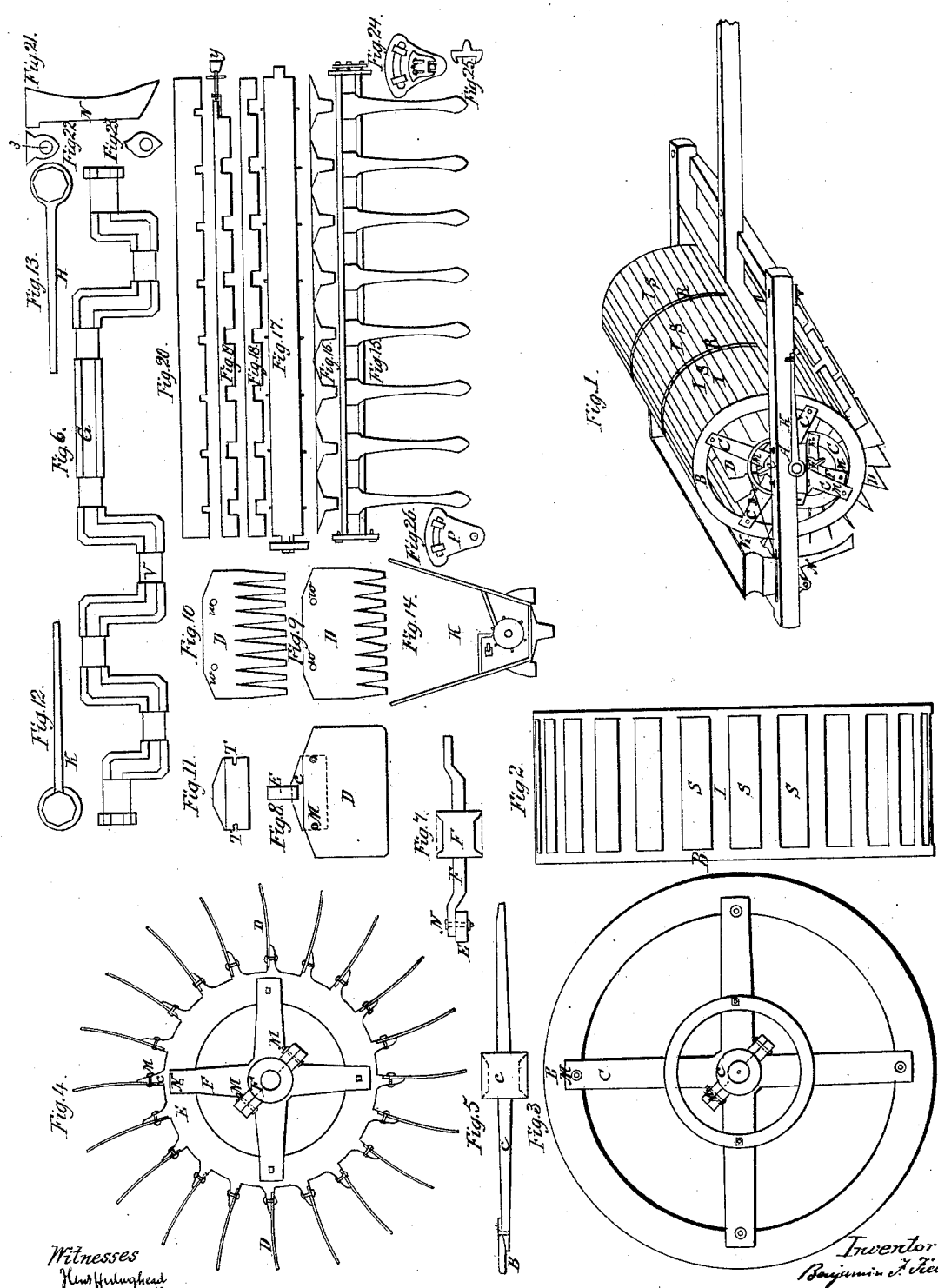

UNITED STATES PATENT OFFICE.

BENJAMIN F. FIELD, OF SHEBOYGAN FALLS, WISCONSIN.

IMPROVEMENT IN ROTARY CULTIVATORS.

Specification forming part of Letters Patent No. 24,799, dated July 19, 1859.

*To all whom it may concern:*

Be it known that I, BENJAMIN F. FIELD, of Sheboygan Falls, in the county of Sheboygan and State of Wisconsin, have invented a new and useful Machine for Cultivating the Soil, which I call "Field's Rotary Plow and Seeding-Machine;" and I do hereby declare that the following is a full, clear, and exact description of the construction and operation of the same, reference being had to the annexed drawings, making a part of this specification, in which—

Figure 1 is a perspective view.

Figs. 2 and 3 are sectional views of the outer wheels or dirt-dischargers, in which B is the large rim, to which the arms C are fastened. c c are the box or hub and arms. M represents the bolts used in various parts of the machine. J is the pulley which drives the seed-shaft. I in Fig. 2 represents the scraper, and S the open spaces through which the spades pass out and in. R is the small rim, which is for the purpose of strengthening scrapers.

Fig. 4 is a transverse view of the spade-wheel with the spades and box-arms attached. F F represent the box or hub and arms; D D, end view of the spades. Q is the spade hand or holder. U is the shoulder on the spade-hand, against which the spades rest.

Fig 5 is a view of the box and arms, showing the manner in which the arms are attached to rim of the outer or discharging wheel; C C, box and arms; B, the rim.

Fig. 6 is a view of the shaft, V representing the journals upon which the boxes of all the wheels play.

Fig. 7 represents the box and arms attached to the spade-wheel; F F, box and arms; E, rim to spade or inner wheel; M, bolt.

Fig. 8 is a transverse view of the spade, showing the manner in which they are secured to the spade-hand. D is the spade; Q, the spade-hand; E, the rim of spade-wheel.

Figs. 9 and 10 are different modes of making the spades; W W, holes in the spades, through which the bolts pass.

Fig. 11 is a view of the spade-hand, T representing notches through which the bolts that hold the spade to the hand pass.

Figs. 12 and 13 are views of the wrenches which are used to hold the shaft in the desired position.

Figs. 14 to 26, inclusive, represent sectional views of the seeding attachment; but as I do not now intend to base any claim upon it, will omit further specifications in this department, except what is necessary in order to make it intelligible.

Letter X in Fig. 17 is the pulley that drives the seed-shaft.

Y in Fig. 19 represents the thumb-screw that is used for the purpose of moving the slide or seed-regulator back and forth for the purpose of sowing fast or slow.

Z in Figs. 22 and 23 represents the hole through the drill feet or teeth, which is for the purpose of conducting the seed into the ground.

To enable others to make and use my invention, I will proceed to describe its construction and operation.

The spade-wheels should be made of cast-iron, and can be large or small, as desired, but must be made to fit the outer or discharging wheel, or, in other words, they must be made with reference to each other, so that the spades will pass in and out through the openings in the dirt-discharging wheel as they revolve. The machine which I have constructed is four and one-half feet in diameter, and composed of three pairs of wheels, each pair cutting eighteen inches of ground. The outer or discharging wheels should also be constructed of cast-iron and of sufficient strength to prevent their breaking in case of coming in contact with stones or other hard substances over which they will be liable to roll.

The boxes or hubs and arms should also be of cast-iron. The box, or rather one-half of it, and two arms are cast together, making one casting, one pattern answering for both parts. The box and arms attached to the spade-wheel should be made very much in the same way as those belonging to the outer wheels. All the difference is in the arms, which should be crooked, so as to bring the hub or box in the center of the wheel and also made somewhat shorter. The hand on the spade-wheel should be cast about ten inches wide (this depends, however, upon the size of the machine) and three to four inches from the shoulder to the outer point, so as to give the spade a good bearing and sufficiently strong to prevent breaking. The notch in the sides of the spade hands or holders should be about one and one-half inch deep and seven-eighths of an inch wide, so as to receive a strong bolt. The wheel should be cast with these notches in them, as holes cannot easily be cast or drilled, owing to the peculiar construction of the wheel. The bolts should be no longer than is necessary to go through the hand and spade and receive the nut, for in case it is longer the tendency would be to catch dirt and weeds that chance to get inside of the machine.

The shaft should also be made of cast-iron and very strong, so as to prevent breaking, or springing even. The length of the shaft is determined by the number and size of the wheels. The journals on the shaft should be far enough apart to allow half an inch space between the outer or discharging wheels to prevent their rubbing against each other.

The spades should always be of steel, from three-sixteenths to three-eighths of one inch in thickness, depending upon the size of the machine and kind of soil that the machine is designed to work in. They should be a little curved and sharpened at the point, so that they will enter the ground easily and cut off cornstalks, weeds, &c. They should be made as long as they can be, and pass out and in through the spaces between the scrapers in the discharging-wheel; and in some kinds of soil it will be necessary to make what I call "forked spades," as represented in Figs. 9 and 10. The forks should be sharpened on their sides as well as point, so as to cut cornstalks and other substances with which they will be liable to come in contact. One object of using the forked spades is to dispense with extra weight in the machine when used, as before stated, in cultivating hard, heavy soil. The machine will also run easier, the spades requiring less force to press them into the ground.

The wrench may be made of cast or wrought iron of sufficient size and strength to hold the shaft in the desired position. The wrench should be fastened with a pin or catch at the end of the handle, thus holding it firmly to the frame.

The boxes or hubs should be concave at each end, so that the scattering dirt that falls through the machine as it revolves will glide off instead of working into the box; and for the purpose of more thoroughly protecting the journals from dust and scattering dirt a washer or shield should be put around the shaft and slipped into the cavity in each end of the boxes or hub, and may be made of india-rubber or any material that will answer the purpose.

The frame may be made of wood braced with iron, if propelled by horses or cattle; but in case steam is employed as the motive power the frame would require more strength, and should be made of iron and adapted to the construction of the engine and boiler.

The shaft to which the drill-feet or seed-conductors are attached should be of cast-iron with a groove cast in it to receive the seed-conductors, which should also be made of iron with a hole through them for the grain to pass through, and the upper end made so as to fit the groove in the shaft, and they may be placed at any desired distance apart.

The seed-shaft may be of wood or other material, and should be about six inches in diameter, with spurs upon it to prevent the grain from clogging, and a pulley should be fastened to the end of the shaft on the off side of the machine, so that when the machine is turning around it will continue to sow seed, which it would not do in case it was on the near side.

The tubes that conduct the grain from the hopper to the drill-feet may be of tin. The hopper and other parts of the machine may be of wood. The drill-feet can be placed in any desired position, so as to sow the seed deep or shallow. The feet are not intended to drag in the ground, but are to be placed so that the earth as it falls from the spades will pass over the lower end of them and close up again behind, and thus covering the seed with very little expense of power. The drill-shaft is run by means of a belt or cord driven over a pulley fastened to the end of the plow.

When it is not desired to sow grain the belt can be removed and the drill-feet turned up under the plow-frame and kept there by means of a holder that is fastened to the frame.

When traveling along the road or going from one field to another the position of the plow-shaft can be changed, so as to have the spades pass through the outer wheels at the top instead of at the bottom, thus keeping the spades entirely from contact with the ground, and the machine then rolls along easily upon the ground, the weight resting upon the outer wheels or dirt-dischargers. The gross weight of the machine must be sufficient to force the spades into the ground as they revolve. Any weight beyond this causes unnecessary friction. As the wheels revolve the spades pass out through the spaces in the discharging or outer wheel on the front side and thence into the ground, taking up the soil that is pressed between them, and then as they draw in on the back side the scrapers on the discharging-wheel remove the earth from between the spades and so on every successive revolution. The falling of the earth from the spades pulverizes it. The length of the crooks in the shaft govern and decide the distance that the spades can project through the outer wheel, which is also the depth that they go into the earth.

What I claim is—

The combination of two or more wheels on one crank, eccentric, or equivalent axle, when the said wheels are arranged in pairs on the axle, one wheel within the other, and so as that the spades or forks attached to the inner wheels shall pass out and in through the appertures in the outer wheels, for the purpose of displacing and pulverizing the soil over which they pass, in the manner described.

BENJAMIN F. FIELD.

Witnesses:
JOHN S. HOLLINGSHEAD,
W. S. CLARY.